(12) United States Patent
Hsu

(10) Patent No.: US 9,360,090 B2
(45) Date of Patent: Jun. 7, 2016

(54) ROTARY SHAFT TRANSMISSION STRUCTURE

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 291 days.

(21) Appl. No.: 13/889,504

(22) Filed: May 8, 2013

(65) Prior Publication Data

US 2014/0224047 A1     Aug. 14, 2014

(30) Foreign Application Priority Data

Feb. 8, 2013   (TW) .............................. 102203009 U

(51) Int. Cl.
*E05D 3/06* (2006.01)
*F16H 19/00* (2006.01)
*F16H 19/06* (2006.01)

(52) U.S. Cl.
CPC ...... *F16H 19/005* (2013.01); *F16H 2019/0677* (2013.01); *Y10T 74/18856* (2015.01)

(58) Field of Classification Search
CPC ......... E05D 3/12; E05D 3/06; E05Y 2900/20; Y10T 16/53824; Y10T 16/53832; Y10T 16/547; G06F 1/1681; H04M 1/022

USPC ................................................ 16/306 K, 302
See application file for complete search history.

(56) References Cited

U.S. PATENT DOCUMENTS

| | | | | |
|---|---|---|---|---|
| 944,681 | A * | 12/1909 | Lowe | 16/366 |
| 8,638,546 | B2 * | 1/2014 | Hoshino | 361/679.01 |
| 8,959,714 | B2 * | 2/2015 | Hsu | E05D 3/06 16/287 |
| 2012/0057280 | A1 * | 3/2012 | Hoshino | 361/679.01 |

FOREIGN PATENT DOCUMENTS

WO    WO 2007086281 A1 *   8/2007   .............. H04M 1/02

* cited by examiner

*Primary Examiner* — Victor Batson
*Assistant Examiner* — Matthew Sullivan
(74) *Attorney, Agent, or Firm* — Rosenberg, Klein & Lee

(57) ABSTRACT

A rotary shaft transmission structure, which is designed with a simplified structure to provide a smooth and stable transmission of a rotary shaft and to reduce the occurrence of rotational torsion variation of the rotary shaft, includes a combination of at least one rotor and a traction portion. The rotor includes a shaft hole and a bolt bore, in which the shaft hole is utilized to pivot the rotary shaft so that the rotor can be rotated by the rotary shaft, the shaft hole transversely passed through by at least a plan area is utilized to retain the traction portion, and the rotary shaft is utilized to press the traction portion via the plan area, thereby forming a fixation function.

23 Claims, 6 Drawing Sheets

ROTARY SHAFT TRANSMISSION STRUCTURE

BACKGROUND OF THE INVENTION

1. Field of the Invention

The invention relates to a rotary shaft transmission structure, in particular relates to a rotary shaft utilizing a combination of a rotor and a traction portion to transmit power in operation and cooperation processes.

2. Description of the Related Art

Rotary shafts or pivot shafts, which are assembled on electric apparatuses (e.g., mobile phones, notebook computers, personal digital assistants (PDAs), digital cameras and E-books, etc.) and capable of being reciprocally freely rotated by an external force so as to provide a rotatable cover, a rotatable display screen or a rotatable viewfinder thereof with opening and closing functions, are generally known as conventional skills, such as typical cases including 'Rotary shaft structure' of Taiwan Application No. 97222022, 'Pivot shaft positioning member' of Taiwan Application No. 96217011 and 'Pivot shaft structure' of Taiwan Application No. 98207366.

In order to provide a display module (e.g., a screen) and/or a machine body module of an electronic apparatus with more operation modes and range of application, conventional skills such as 'Ultra wide range angle dual rotary shaft structure' of Taiwan Application No. 96148572 and 'Dual pivot shaft hinge' of Taiwan Application No. 99211350, are executable cases to provide a dual rotary shaft between the display module and the machine body module, enabling the display module and the machine body module to form a structure for producing different operation modes or rotation angles.

One topic related to operations, motions and structural designs of the above-described cases shall be concerned is that, in these pivot shafts or rotary shafts, the rotary shaft is generally cooperated with combinations of washers providing through holes and concave-convex positioning portions, friction plates and springs thereon, both ends of the rotary shaft are respectively secured by retaining rings or fixing members, and energy storage and release of the springs are cooperated to attain the rotational and positioning functions of the rotary shaft assembly or the pivot shaft assembly. The design, assembly and cooperation of the entire structure of the above-described components are relatively complicated; however, these conditions are not our expectations.

In some conventional skills, a cooperation which applies components such as a turning wheel and a wire material (or a driving belt) for linking-up and traction is disclosed to transmit power or to drive the rotary shaft for movement. However, as known by those who skilled in these arts, the combined structure of the wire material (or the driving belt) may have occurrence of kinetic transmission delay in the cooperating and driving operation processes, resulted from reasons such as clearances existed in a combination of between the wire material (or the driving belt) and the turning wheel to cause sliding movement or unreliable operation of the wire material (or the driving belt) in the cooperating and driving operation processes, and a nonideal fixation structure which is applied for combining the wire material (or the driving belt) and the turning wheel to cause an increased traction and pulling event in the process of loading the wire material or transmitting power, a reduced transmission displacement effect or a condition of the wire material disengaged from the turning wheel.

Representatively speaking, these reference data reveal the conditions of usage and structural design of the rotary shaft or components connected therewith. If the structures of the rotary shaft, the components connected therewith and the above-described applications of the rotary shaft can be properly redesigned and reconsidered, the use pattern and the application conditions of the rotary shaft can be advancedly altered to be distinguished from conventional methods, substantially to improve range of application and to increase the assembling convenience.

According to the above-described contents, it is understood that the following topics shall be carefully considered in the aspects of structural design and operation technique.

Firstly, in the consideration of structural design of the above-described transmission mechanism, patterns of combining the rotary shaft with conventional skills such as washers providing through holes and concave-convex positioning portions, friction plates and springs, and the conventional skill of using energy storage and release of the cooperated springs to attain the rotational and positioning functions of the rotary shaft assembly, shall be avoided.

Secondly, a unique design different from the transmission mechanisms and the cooperating structure connected therewith in conventional skills shall be provided to solve or improve the conditions, such as clearances existed in the combination of between the wire material and the turning wheel to cause sliding movement or unreliable operation of the wire material in the cooperating and driving operation processes, and the nonideal fixation structure which is applied for combining the wire material and the turning wheel to cause an increased traction and pulling event in the process of loading the wire material or transmitting power, and the reduced transmission displacement effect.

However, these topics are not taught or disclosed in the above-mentioned reference data.

BRIEF SUMMARY OF THE INVENTION

In view of this, the invention provides a rotary shaft transmission structure, which is designed with a simplified structure to provide a smooth and stable transmission of a rotary shaft and to reduce rotational torsion variation of the rotary shaft, includes a combination of at least one rotor and a traction portion. The rotor includes a shaft hole and a bolt bore, in which the shaft hole is utilized to pivot the rotary shaft so that the rotor can be rotated by the rotary shaft, the shaft hole transversely passed through by at least a plan area is utilized to retain the traction portion, and the rotary shaft is utilized to press the traction portion via the plan area, thereby forming a fixation function to promote the effects of (synchronous) displacement and stability of the rotary shaft transmission structure in operation processes.

According to the rotary shaft transmission structure of the invention, the rotor includes a first rotor and a second rotor, and the traction portion formed as a (flexible) cable pattern includes a first end and a second end. The traction portion is windingly arranged on the first and second rotors. When the first and second ends of the traction portions are respectively inserted into bolt bores of the first and second rotors to connect fixation portions, the first and second ends of the traction portions can be respectively fixed on the first and second rotors.

In the structural pattern of the first and second rotors cooperating with the traction portions for transmission, the occurrence of rotational torsion variation shall be possibly minimized. Accordingly, a smooth rotation movement of the first and second shafts can be obtained, and the first and second shafts can be stopped rotation and positioned when the operation force of the operator is removed from the rotary shaft transmission structure.

According to the rotary shaft transmission structure of the invention, the rotor is formed with a recessed room which is connected or communicated with the bolt bore and utilized to receive the fixation portion.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
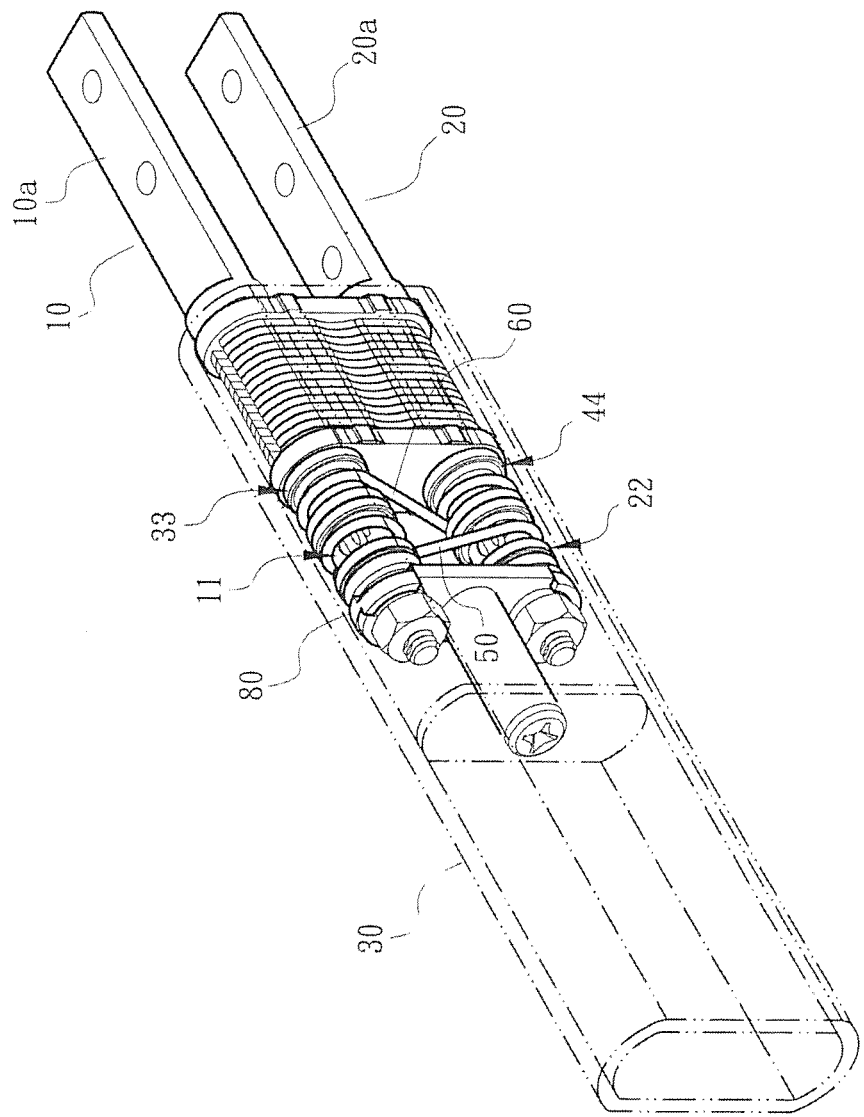
FIG. 1 is a schematic view of an dual rotary shaft device of an embodiment of the invention assembled with and a housing, illustrating a combination condition of a first shaft, a second shaft, a first rotor, a second rotor, a third rotor, a fourth rotor and traction portions.
Figure 2:
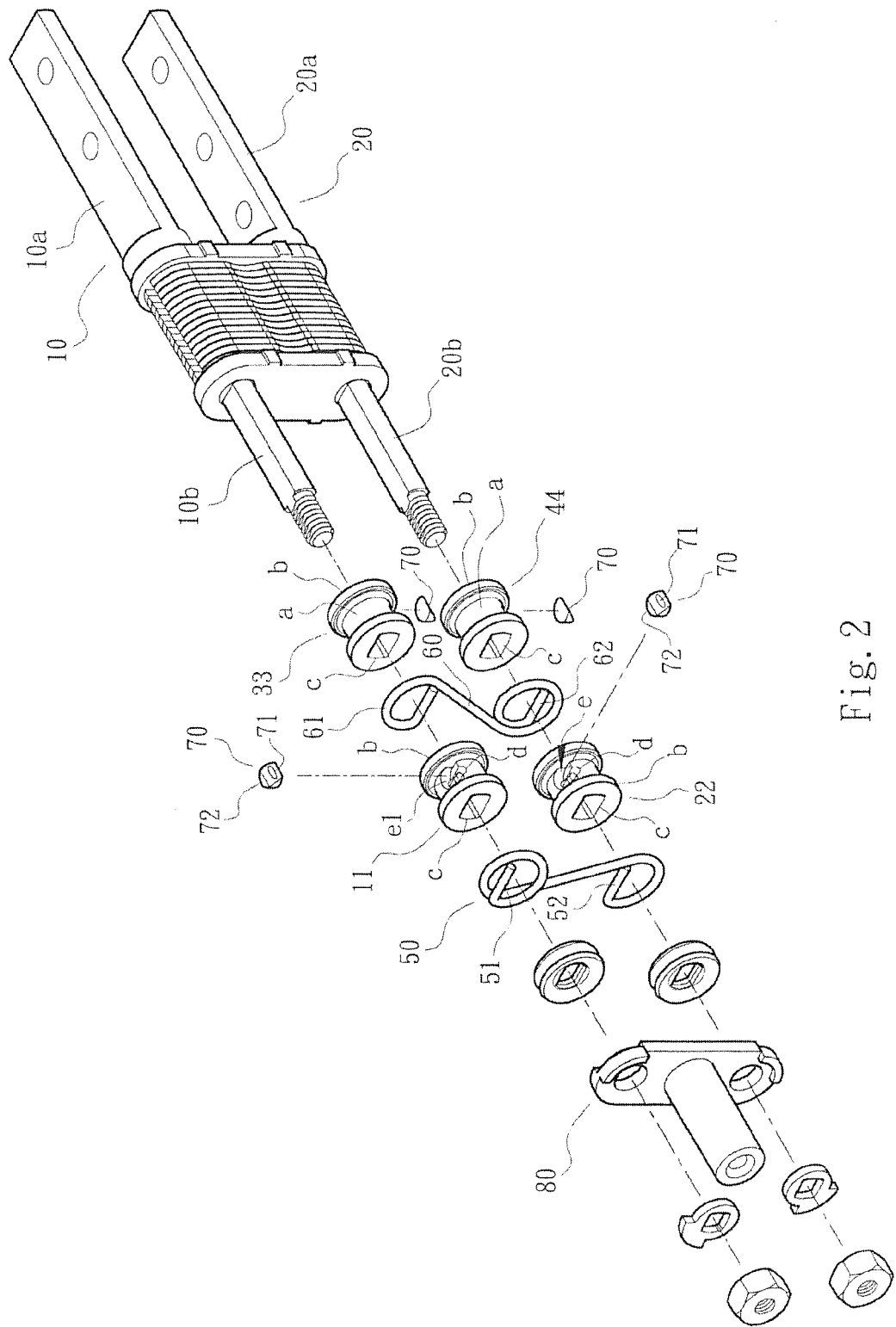
FIG. 2 is an exploded schematic view of a structure of the dual rotary shaft device of the invention.
Figure 3:
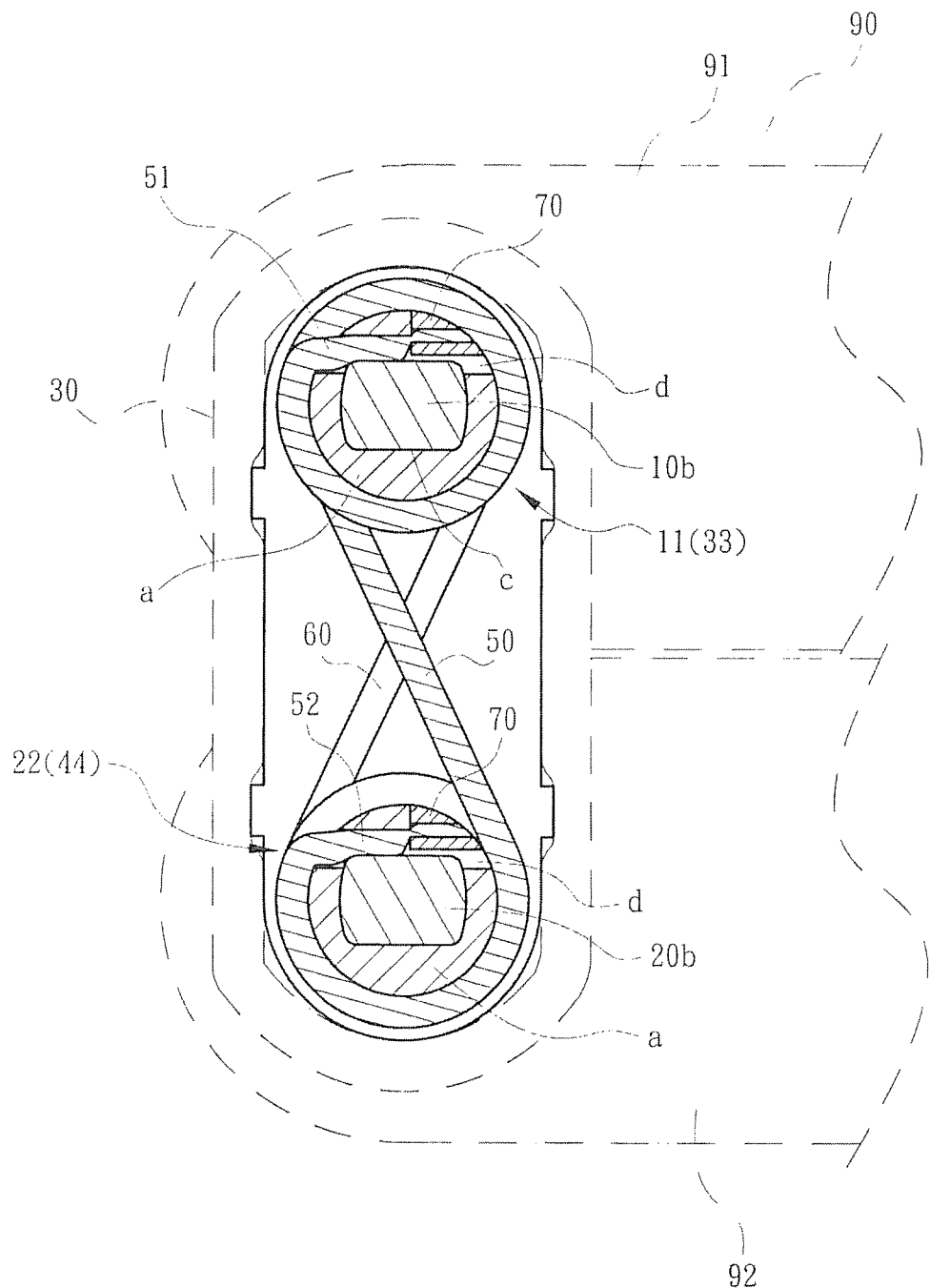
FIG. 3 is a cross-sectional schematic view of a structure of the invention, illustrating positions of a housing, a display module and a machine body module by imaginary lines.

Referring to FIGS. 1, 2 and 3, a dual rotary shaft device which is selected as an adopted embodiment of a rotary shaft transmission structure of the invention is described herein. The dual rotary shaft device comprises a first shaft and a second shaft that are generally represented by reference numerals 10 and 20, respectively. The first and second shafts 10 and 20 are assemblingly disposed in a housing 30. The first shaft 10 is provided with a fixation end 10a and a pivot end 10b, and the second shaft 20 is provided with a fixation end 20a and a pivot end 20b, in which the fixation end 10a of the first shaft 10 and the fixation end 20a of the second shaft 20 are engaged to a fixation seat (not shown in FIGS.), so that the first and second shafts 10 and 20 are respectively fixed on a display module 91 and a machine body module 92 of an electronic apparatus 90 (e.g., a mobile phone, a computer, etc.).

In FIGS. 1 and 2, a combination pattern of the pivot end 10b of the first shaft 10 and the pivot end 20b of the second shaft 20 that are disposed with a plurality of rotors 11, 22, 33 and 44 and traction portions 50 and 60 is illustrated. The dual rotary shaft device of the invention is a combination of the rotors 11, 22, 33 and 44 and the traction portions 50 and 60. In the adopted embodiment, the rotors 11, 22, 33 and 44 are divided into a first rotor 11, a second rotor 22, a third rotor 33 and a fourth rotor 44, in which the first rotor 11 and the third rotor 33 are disposed on the pivot end 10b of the first shaft 10, and the second rotor 22 and the fourth rotor 44 are disposed on the pivot end 20b of the second shaft 20. The traction portion 50 is configured between the first and second rotors 11 and 22, and the traction portion 60 is configured between the third and fourth rotors 33 and 44. The first, second, third and fourth rotors 11, 22, 33 and 44 and the traction portions 50 and 60 are combined to the first and second shafts 10 and 20 by cooperating with a fixation assembly 80.

In the adopted embodiment, the first, second, third and fourth rotors 11, 22, 33 and 44 are formed as a turning wheel pattern, and each of the first, second, third and fourth rotors 11, 22, 33 and 44 comprises a body 'a' formed as a cylindrical pattern and two shoulder portions 'b' respectively configured on both ends of the body 'a', in which the body 'a' has a width (or a diameter) less than that of the shoulder portion 'b'.

In FIGS. 1 and 2, each of the first, second, third and fourth rotors 11, 22, 33 and 44 comprises the body 'a' providing a shaft hole 'c' formed with a profile which is equal to a section shape of the pivot end 10b of the first shaft 10 and a section shape of the pivot end 20b of the second shaft 20. For example, in FIGS. 1 and 2, each of the pivot end 10b of the first shaft 10 and the pivot end 20b of the second shaft 20 is formed as a rectangular section pattern, and each of the first, second, third and fourth rotors 11, 22, 33 and 44 comprises the shaft hole 'c' formed as a rectangular section pattern, so that the shaft holes 'c' of the first, second, third and fourth rotors 11, 22, 33 and 44 can be engaged to the pivot end 10b of the first shaft 10 and the pivot end 20b of the second shaft 20 to have a fixedly-connected effect. Besides, the first rotor 11 and the third rotor 33 are rotated together with the first shaft 10, and the second rotor 22 and the fourth rotor 44 are rotated together with the second shaft 20.

Referring to FIGS. 2 and 3, the traction portion 50 configured between the first and second rotors 11 and 22 and the traction portion 60 configured between the third and fourth rotors 33 and 44 are respectively formed as a (flexible) cable pattern, in which the traction portion 50 comprising a first end 51 and a second end 52 is windingly arranged on the bodies 'a' of the first and second rotors 11 and 22, and the traction portion 60 comprising a first end 61 and a second end 62 is windingly arranged on the bodies 'a' of the third and fourth rotors 33 and 44.

In the adopted embodiment, each of the first, second, third and fourth rotors 11, 22, 33 and 44 comprises the body 'a' which is further provided with a bolt bore 'd', and four fixation portions 70 are further provided to combine the traction portions 50 and 60. The first end 51 of the traction portion 50 is passed through the bolt bore 'd' of the first rotor 11 to combine the corresponding fixation portion 70, the second end 52 of the traction portion 50 is passed through the bolt bore 'd' of the second rotor 22 to combine the corresponding fixation portion 70, the first end 61 of the traction portion 60 is passed through the bolt bore 'd' of the third rotor 33 to combine the corresponding fixation portion 70, and the second end 62 of the traction portion 60 is passed through the bolt bore 'd' of the fourth rotor 44 to combine the corresponding fixation portion 70. Accordingly, with the installation of the fixation portions 70, the first and second ends 51 and 52 of the traction portion 50 and the first and second ends 61 and 62 of the traction portion 60 can be prevented from disengaging from the first, second, third and fourth rotors 11, 22, 33 and 44. Besides, with the limitation of the shoulder portions 'b' configured on both ends of the body 'a', the traction portion 50 can be prevented from slipping off the first rotor 11 or the second rotor 22, and the traction portion 60 can be prevented from slipping off the third rotor 33 or the fourth rotor 44.

In a modified embodiment, after finishing processes of passing the first end 51 of the traction portion 50 through the bolt bore 'd' of the first rotor 11, passing the second end 52 of the traction portion 50 through the bolt bore 'd' of the second rotor 22, passing the first end 61 of the traction portion 60 through the bolt bore 'd' of the third rotor 33, and passing the second end 62 of the traction portion 60 through the bolt bore 'd' of the fourth rotor 44, the first, second, third and fourth rotors 11, 22, 33 and 44 (or the bodies 'a' or the bolt bores 'd' thereof) are respectively forced to press the first end 51 of the traction portion 50, the second end 52 of the traction portion 50, the first end 61 of the traction portion 60 and the second end 62 of the traction portion 60 via a pressing function, so that the first end 51 of the traction portion 50, the second end 52 of the traction portion 50, the first end 61 of the traction portion 60 and the second end 62 of the traction portion 60 are respectively fixed on the first, second, third and fourth rotors 11, 22, 33 and 44 (or the bodies 'a' or the bolt bores 'd' thereof) without disengagement therebetween.

Still referring to FIGS. 2 and 3, in the configuration of the invention, the traction portion 50 configured on the first and second rotors 11 and 22 is wound in a direction of directing from the first rotor 11 toward the second rotor 22, and the traction portion 60 configured with the third and fourth rotors 33 and 44 is wound in a direction of directing from the third rotor 33 toward the fourth rotor 44 and opposite to the direction of the traction portion 50 directing from the first rotor 11 toward the second rotor 22. In FIG. 3 for example, the traction portion 50 configured on the first and second rotors 11 and 22 is wound in a direction of directing from a left side of the first rotor 11 toward a right side of the second rotor 22, and the traction portion 60 configured with the third and fourth rotors 33 and 44 is wound in a direction of directing from a right side of the third rotor 33 toward a left side of the fourth rotor 44 and opposite to the direction of the traction portion 50 directing from the first rotor 11 toward the second rotor 22, so that the first shaft 10 and the second rotor 22 are capable of producing rotation directions different from each other.

Figure 4:
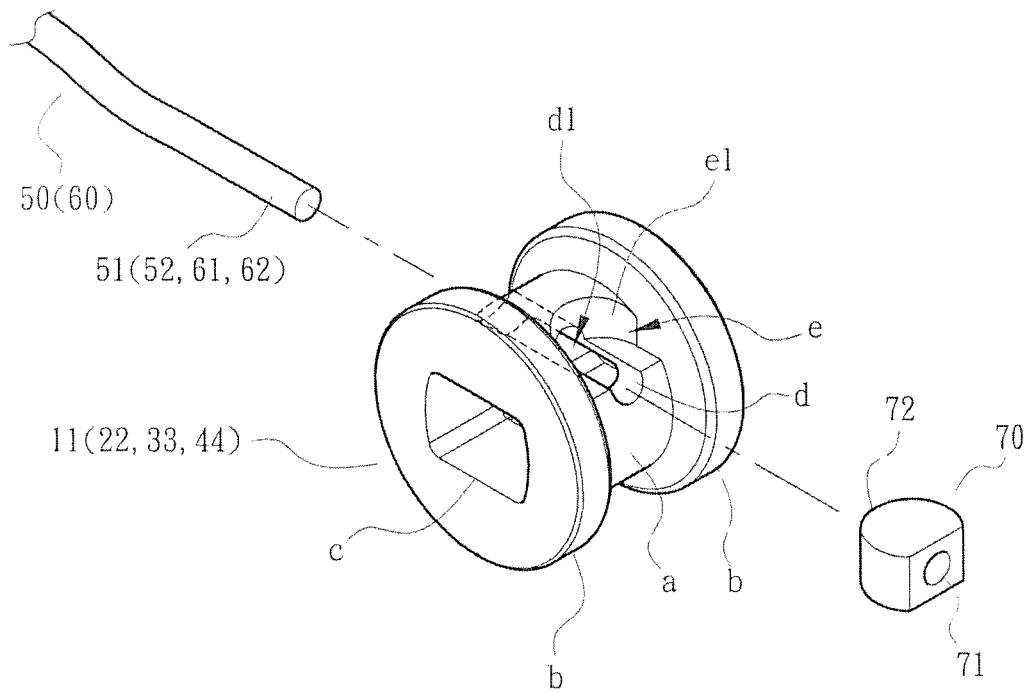
FIG. 4 is a perspective view of a structure of a rotor, a traction portion and a fixation portion of the invention.
Figure 5:
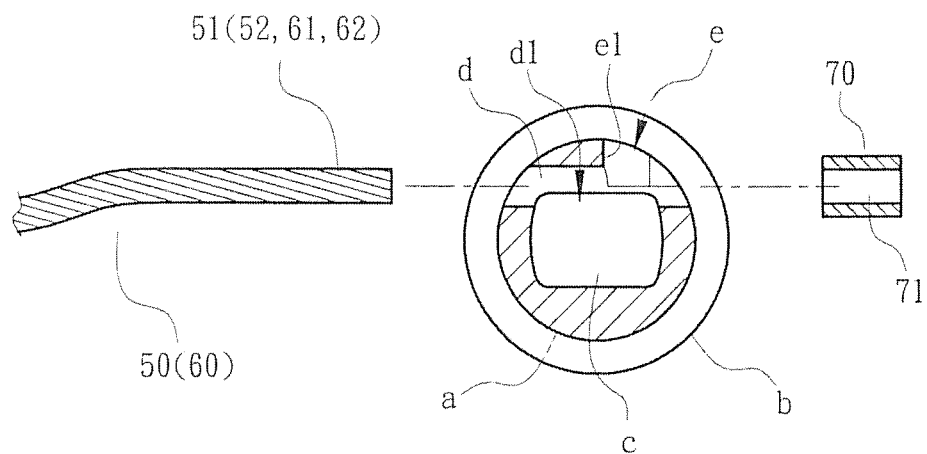
FIG. 5 is a cross-sectional schematic view of the structure in FIG. 4.

Referring to FIGS. 3, 4 and 5, in a preferred embodiment, the bolt bore 'd' of each of the first, second, third and fourth rotors 11, 22, 33 and 44 comprises (at least) a plan area 'd1' which transversely passes through the shaft hole 'c' on the drawings, so that the bolt bore 'd' can be formed as a hole pattern. Accordingly, with the configuration of the plan areas 'd1' provided on the bolt bores 'd' of the first, second, third and fourth rotors 11, 22, 33 and 44, when the first end 51 of the traction portion 50 is passed through the bolt bore 'd' of the first rotor 11 to combine the corresponding fixation portion 70, the second end 52 of the traction portion 50 is passed through the bolt bore 'd' of the second rotor 22 to combine the corresponding fixation portion 70, the first end 61 of the traction portion 60 is passed through the bolt bore 'd' of the third rotor 33 to combine the corresponding fixation portion 70, and the second end 62 of the traction portion 60 is passed through the bolt bore 'd' of the fourth rotor 44 to combine the corresponding fixation portion 70, the first shaft 10 that is passed through the shaft holes 'c' of the first and third rotors 11 and 33 and the second shaft 20 that is passed through the shaft holes 'c' of the second and fourth rotors 22 and 44 can be respectively utilized to press the traction portions 50 and 60, via the plan areas 'd1' of the bolt bores 'd' of the first and third rotors 11 and 33 and the plan areas 'd1' of the bolt bores 'd' of the second and fourth rotors 22 and 44.

Figure 6:
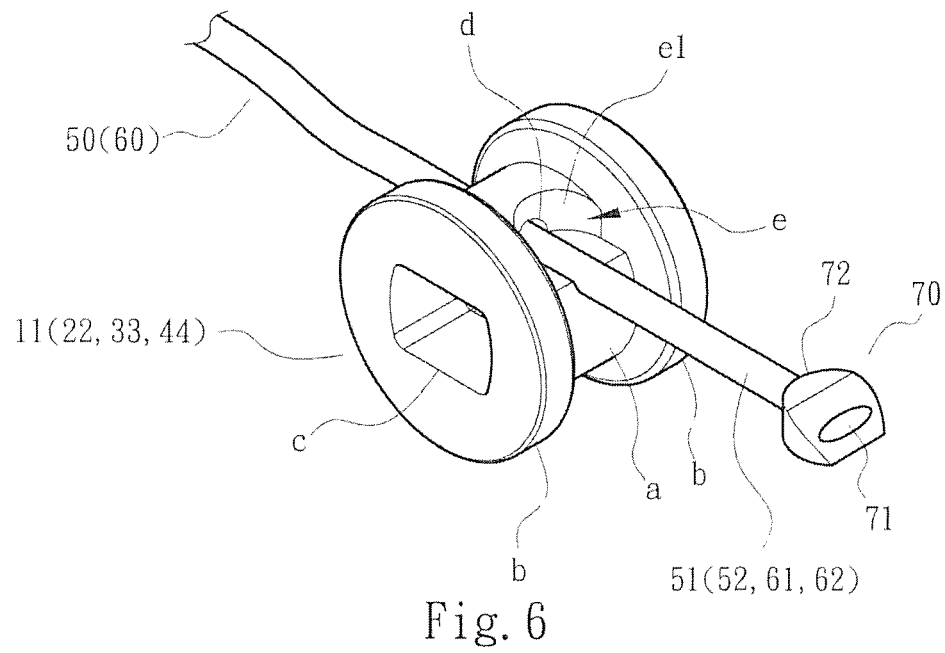
FIG. 6 is a perspective view of a structure of the invention, illustrating a pressed combination condition of a traction portion passed through a bolt bore of a rotor and a fixation portion.
Figure 7:
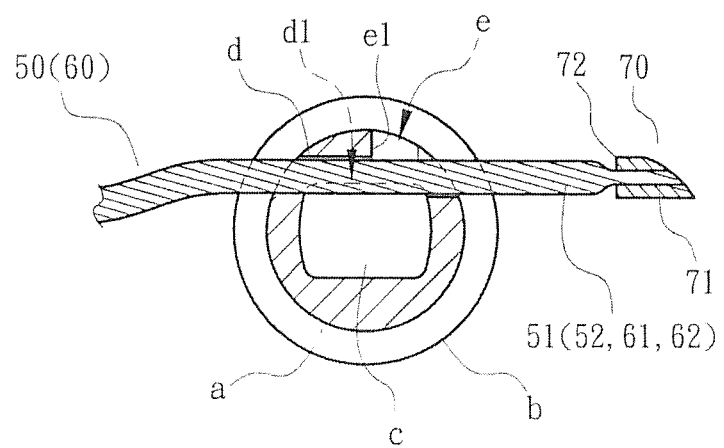
FIG. 7 is a cross-sectional schematic view of the structure in FIG. 6.

In an executable embodiment, the fixation portion 70 comprises a hole 71 that is utilized to combine any one of the first and second ends 51 and 52 of the traction portion 50 and the first and second ends 61 and 62 of the traction portion 60. When the hole 71 of the fixation portion 70 is combine with any one of the first and second ends 51 and 52 of the traction portion 50 and the first and second ends 61 and 62 of the traction portion 60, the fixation portion 70 and the hole 71 thereof can be deformed via a pressing operation so that the fixation portion 70 and the combined traction portion 50 or 60 can be integrally formed without disengagement therebetween, as shown in FIGS. 6 and 7.

Figure 8:
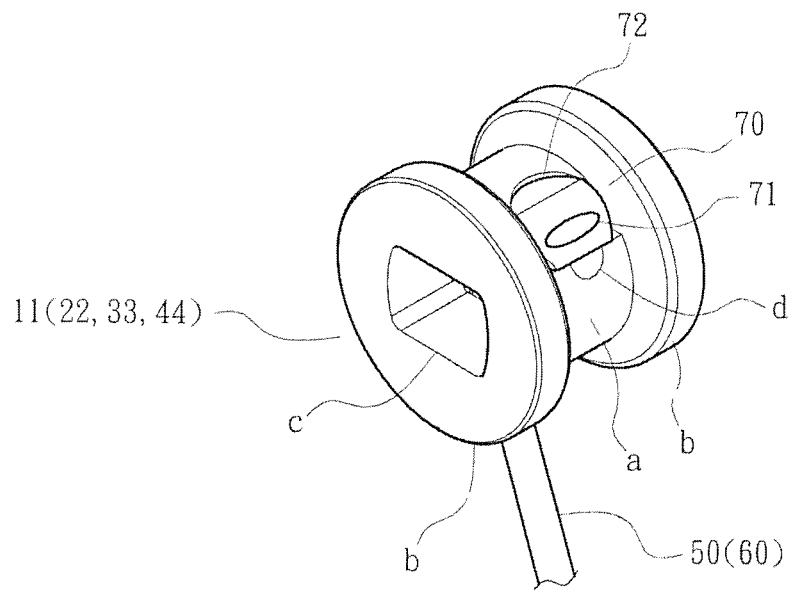
FIG. 8 is a perspective view of a structure of the invention, illustrating a combination condition of a recessed room of a rotor that is received with a fixation portion.
Figure 9:
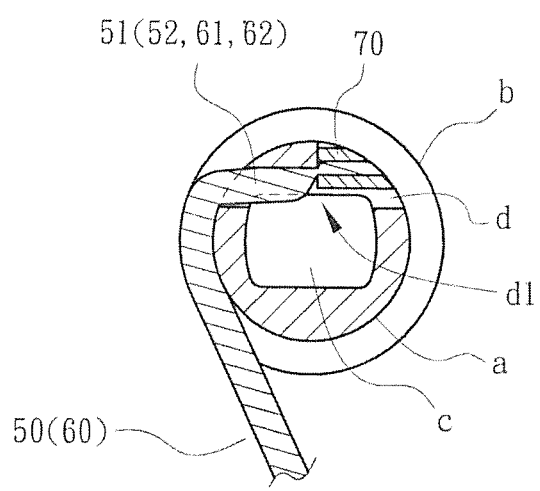
FIG. 9 is a cross-sectional schematic view of the structure in FIG. 8.

In the adopted preferred embodiment shown in FIGS. 8 and 9, the body 'a' of each of the first, second, third and fourth rotors 11, 22, 33 and 44 is formed with a recessed room 'e' (see FIGS. 4, 5, 6 and 7) which is communicated with the bolt bore 'd' and utilized to receive the fixation portion 70, thereby respectively fixing the first and second ends 51 and 52 of the traction portion 50 to the first and second rotors 11 and 22 and fixing the first and second ends 61 and 62 of the traction portion 60 to the third and fourth rotors 33 and 44.

As shown in FIGS. 4, 5, 6, 7, 8 and 9, in an executable embodiment, the recessed room 'e' of the body 'a' of each of the first, second, third and fourth rotors 11, 22, 33 and 44 is further provided with a wall or an arcuate wall 'e1', and the fixation portion 70 further comprises a face or an arcuate face 72 which is corresponded to the wall 'e1' of the recessed room 'e' of the body 'a' of the rotor 11, 22, 33 and 44. When the first and second ends 51 and 52 of the traction portion 50 are respectively fixed on the first and second rotors 11 and 22, or when the first and second end 61 and 62 of the traction portion 60 are respectively fixed on the third and fourth rotors 33 and 44, the face 72 of the fixation portion 70 combined with the traction portion 50 or 60 is capable of pressing against the wall 'e1' of the recessed room 'e' of the body 'a', thereby stabilizing the combination structure of the fixation portion 70 and the recessed room 'e' of each of the first, second, third and fourth rotors 11, 22, 33 and 44. Besides, the wall 'e1' of the recessed room 'e' of each of the first, second, third and fourth rotors 11, 22, 33 and 44 can also provide functions of stopping and loading when the fixation portions 70 is pulled by the traction portions 50 and 60 for power transmission.

In particular, FIG. 3 illustrates that, when the pivot end 10b of the first shaft 10 is pivotally engaged to the shaft holes of the first and third rotors 11 and 33 and the pivot end 20b of the second shaft 20 is pivotally engaged to the shaft holes 'c' of the second and fourth rotors 22 and 44, the pivot end 10b of the first shaft 10 and the pivot end 20b of the second shaft 20 are utilized to respectively press the traction portions 50 and 60 via the plan areas 'd1' (see FIGS. 4 and 5) of the first, second, third and fourth rotors 11, 22, 33 and 44, thereby forming a fixation function.

That is, the first and second ends 51 and 52 of the traction portion 50 can be fixedly pressed by the fixation portion 70 and the pivot end 10b of the first shaft 10 when being inserted into the bolt bores 'd' of the first and second rotors 11 and 22, and the first and second ends 61 and 62 of the traction portion 60 can be fixedly pressed by the fixation portion 70 and the pivot end 20b of the second shaft 20 when being inserted into the bolt bores 'd' of the third and fourth rotors 33 and 44, thereby promoting the effects of (synchronous) displacement and stability of the rotary shaft transmission structure in operation processes.

Referring again to FIG. 3, presumed that the display module 91 is in a closed state with an included angle of zero relatively disposed on the machine body module 92, when an operator opens the display module 91, the first shaft 10 is driven to rotate the first and third rotors 11 and 33 in a counter clockwise direction (on the drawing), and synchronously the traction portion 50 or 60 is driven to pull the second rotor 22 or fourth rotor 44 to rotate the second shaft 20 in a direction (i.e., in a clockwise direction) opposite to the first and third rotors 11 and 33. Accordingly, the first and second shafts 10 and 20 with a synchronous rotation pattern therebetween can be obtained.

Based on the transmission of the rotors 11, 22, 33 and 44 cooperating with the traction portions 50 and 60, the operator is allowed to operate the rotary shaft transmission structure by opening the display module 91 to rotate the first shaft 10 to a position of 180 degrees in the counter clockwise direction, thus to synchronously rotate the second shaft 20 and the machine body module 92 to a position of 180 degrees in the clockwise direction, i.e., the display module 91 and the machine body module 92 can have a rotation range of 360 degrees therebetween in this operation process.

That is, with the configuration of the rotary shaft transmission structure, when the operator operates the display module 91 to rotate at a rotation angle or range, a double length of run corresponding to the rotation angle or range between the display module 91 and the machine body module 92 can be obtained, thereby achieving an efficacy of rapid operation.

In a preferred embodiment, the traction portion 50 has a length that is at least equal to or greater than one-half of a circumference of the rotor (the first rotor 11) to keep the traction portion 50 (or the first end 51 of the traction portion 50) to be wound on the body 'a' of the rotor (the first rotor 11), after the rotor (the first rotor 11) has a rotation angle of 180 degrees rotatably followed by the rotary shaft (the first shaft 10). That is, the traction portion 50 (or the first end 51 of the traction portion 50) configured on the rotor (the first rotor 11) has a length that is equal to or greater than a circumference distance of the rotor (the first rotor 11) with a rotation angle of 90 degrees to keep the traction portion 50 to be wound on the rotor (the first rotor 11), after the rotor (the first rotor 11) has a rotation angle of 180 degrees.

It is understood that the traction portion 60 has a length that is at least equal to or greater than one-half of a circumference of the rotor (the fourth rotor 44) to keep the traction portion 60 (or the second end 62 of the traction portion 60) to be wound on the body 'a' of the rotor (the fourth rotor 44), after the rotor (the fourth rotor 44) and the rotary shaft (the second shaft 20) have a rotation angle of 180 degrees. That is, the traction portion 60 (or the second end 62 of the traction portion 60) configured on the rotor (the fourth rotor 44) has a length that is equal to or greater than a circumference distance of the rotor (the fourth rotor 44) with a rotation angle of 90 degrees to keep the traction portion 60 to be wound on the rotor (the fourth rotor 44), after the rotor (the fourth rotor 44) has a rotation angle of 180 degrees.

It is needed to further explain that, with the transmission cooperation structure of the traction portion 50 tightly wound on the first and second rotors 11 and 22 and the traction portion 60 tightly wound on the third and fourth rotors 33 and 44, the traction portions 50 and 60 and the bodies 'a' of the first, second, third and fourth rotors 11, 22, 33 and 44 can form a friction (friction force) combination pattern therebetween during the power transmission process, thereby possibly minimizing the rotational torsion variation or sliding movement occurred in conventional skills. Accordingly, a smooth rotation movement of the first and second shafts 10 and 20 can be obtained, and the first and second shafts 10 and 20 can be stopped rotation and positioned when the operation force of the operator is removed from the rotary shaft transmission structure.

Meanwhile, with the friction (friction force) combination pattern of between the traction portions 50 and 60 and the bodies 'a' of the first, second, third and fourth rotors 11, 22, 33 and 44, cooperating the combined structure of the traction portions 50 and 60, the fixation portions 70 and the recessed rooms 'e' of the first, second, third and fourth rotors 11, 22, 33 and 44, the traction portions 50 and 60 can be prevented from being abruptly pulled apart by an external force during the power transmission process.

Representatively speaking, with the conditions of operative rotational and locating functions of the rotary shaft transmission structure, the invention provides the considerations and advantages as follows, compared with conventional skills.

Firstly, the combinations of the rotors and the traction portions of the rotary shaft transmission structure, such as the bolt bore 'd' and the plan area 'd1' that are passed through the shaft hole 'c' in any rotors 11, 22, 33 and 44, the pressed combination of the traction portions 50 and 60 and the fixation portion 70, the fixation portion 70 received by the recessed room 'e' of any rotors 11, 22, 33 and 44, the pivot end 10b of the first shaft 10 and the pivot end 20b of the second shaft 20 that are utilized to press the traction portions 50 and 60 via the plan areas 'd1' of the rotors 11, 22, 33 and 44, etc., have been redesigned and reconsidered, providing features and advantages that are obviously distinguished from the structural pattern of energy storage and release of the components such as multiple washers and friction plates cooperating with springs in conventional skills. In addition, the effects of (synchronous) displacement and stability of the rotary shaft transmission structure in operation processes can be promoted.

Secondly, conditions occurred in conventional skills, such as clearances existed in a combination between the wire material and the turning wheel to cause sliding movement or unreliable operation in the cooperating and driving operation processes, or the nonideal fixation structure which is applied for combining the wire material and the turning wheel to cause increased traction and pulling event in the process of loading the wire material or transmitting power and reduced transmission displacement effect, can be obviously improved.

Accordingly, the invention provides an effective rotary shaft transmission structure featuring of a unique spatial pattern and incomparable advantages and inventiveness, superior to conventional skills.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A rotary shaft transmission structure which is a combination of at least one rotor and a traction portion, the rotor comprising:
a body providing a shaft hole utilized to fixedly connect a rotary shaft and a bolt bore, the traction portion formed as a flexible cable pattern to be windingly arranged on the body and comprising a first end and a second end, and at least one of the first end and the second end of the traction portion being passed through the bolt bore of the body to be fixed on the body;
wherein when the traction portion is threaded through the bolt bore, at least one of the first end or the second end of the traction portion is coupled to a fixation portion, the fixation portion defines a hole formed therethrough for inserting the traction portion, and the fixation portion and the traction portion are integrally formed by pressing;

wherein the body of the rotor is formed with a recessed room communicated with the bolt bore to receive the fixation portion, the recessed room including an outer wall surface, and the fixation portion further comprises an outer face surface corresponding to the outer wall surface of the recessed room.

2. The rotary shaft transmission structure as claimed in claim 1, wherein the bolt bore defines a through hole that includes an impinging region intersecting and passing through the shaft hole, and the rotary shaft biasing the traction portion via the impinging region against an inner wall of the bolt bore.

3. The rotary shaft transmission structure as claimed in claim 1, wherein the outer surface wall of the recessed room of the body of the rotor and the outer face surface of the fixation portion are formed as an arcuate contour.

4. A rotary shaft transmission structure which is a combination of at least one rotor and a traction portion, the rotor comprising:
a body providing a shaft hole utilized to fixedly connect a rotary shaft assembly and a bolt bore, the traction portion formed as a flexible cable pattern to be windingly arranged on the body and comprising a first end and a second end, and at least one of the first end and the second end of the traction portion being passed through the bolt bore of the body to be fixed on the body;
wherein the rotary shaft assembly comprises a First shaft and a second shalt that are respectively provided with a fixation end and a pivot end, the rotary shaft transmission structure including four rotors and two traction portions, a first rotor of said four rotors is disposed on the pivot end of the first shaft, a second rotor of said four rotors is disposed on the pivot end of the second shaft, a third rotor of said lour rotors is disposed on the pivot end of the first shaft, and a fourth rotor of said four rotors is disposed on the pivot end of the second shaft, and a first traction portion is configured between the first rotor and the second rotor and a second traction portion is configured between the third rotor and the fourth rotor so that the first shaft and the second shaft are synchronously rotated.

5. The rotary shaft transmission structure as claimed in claim 4, wherein the body of each of the first rotor, the second rotor, the third rotor and the fourth rotor has a cylindrical contour.

6. The rotary shaft transmission structure as claimed in claim 1, wherein the body of the rotor comprises at least one end that is configured with a shoulder portion.

7. The rotary shaft transmission structure as claimed in claim 6, wherein the body of the rotor has a diameter less than that of the shoulder portion.

8. The rotary shaft transmission structure as claimed in claim 1, wherein the rotor comprises the shaft hole having substantially the same contour as the contour of the rotary shaft.

9. The rotary shaft transmission structure as claimed in claim 4, wherein each of the first rotor, the second rotor, the third rotor and the fourth rotor comprises the shaft hole having substantially the same contour as the contour of the pivot ends of the first shaft and the second shaft.

10. The rotary shaft transmission structure as claimed in claim 9, wherein the pivot ends of the first shaft and the second shaft and the shaft hole of the rotor have shapes that are formed as a rectangular section pattern.

11. A rotary shaft transmission structure which is a combination of at least one rotor and a traction portion, the rotor comprising:
a body providing a shaft hole utilized to fixedly connect a rotary shaft and a bolt bore, the traction portion formed as a flexible cable pattern to be windingly arranged on the body and comprising a first end and a second end, and at least one of the first end and the second end of the traction portion being passed through the bolt bore of the body to be fixed on the body;
wherein the rotary shaft comprises a first shaft and a second shaft that are respectively provided with a fixation end and a pivot end, the rotary shaft transmission structure including four rotors and two traction portions, a first rotor of said four rotors is disposed on the pivot end of the first shaft, a second rotor of said four rotors is disposed on the pivot end of the second shaft, a third rotor of said four rotors is disposed on the pivot end of the first shaft, and a fourth rotor of said four rotors is disposed on the pivot end of the second shaft, and a first traction portion is configured between the first rotor and the second rotor and a second traction portion is configured between the third rotor and the fourth rotor so that the first shaft and the second shaft are synchronously rotated;
wherein one of the traction portions configured with the first rotor and the second rotor comprises the first end and the second end that are windingly arranged on the bodies of the first rotor and the second rotor respectively, and another traction portion configured with the third rotor and the fourth rotor comprises the first end and the second end that are windingly arranged on the bodies of the third rotor and the fourth rotor respectively.

12. The rotary shaft transmission structure as claimed in claim 11, wherein one of the traction portions configured with the first rotor and the second rotor is wound in a first direction towards the second rotor, and another traction portion configured with the third rotor and the fourth rotor is wound in a second direction towards the fourth rotor, and the first direction and second direction being opposite each to the other, whereby the first shaft and the second rotor counter-rotates.

13. The rotary shaft transmission structure as claimed in claim 1, wherein the traction portion has a rotor body engaging segment with a length that is at least equal to one-half of a circumference of the rotor after the rotor is rotated 180 degrees about the rotary shaft.

14. The rotary shaft transmission structure as claimed in claim 4, wherein the traction portion configured on the first rotor and the second rotor has a rotor body engaging segment with a length that is at least equal to one-half of a circumference of the first rotor after the first rotor is rotated 180 degrees about the first shaft.

15. The rotary shaft transmission structure as claimed in claim 4, wherein the traction portion configured on the first rotor and the second rotor has a rotor body engaging segment with a length that is greater than a circumference distance of the first rotor being rotated 90 degrees after the first rotor has been rotated 180 degrees.

16. The rotary shaft transmission structure as claimed in claim 4, wherein the traction portion configured with the third rotor and the fourth rotor has a rotor body engaging segment with a length that is at least equal to one-half of a circumference of the fourth rotor after the fourth rotor and the second shaft have been rotated 180 degrees.

17. The rotary shaft transmission structure as claimed in claim 4, wherein the traction portion configured with the third rotor and the fourth rotor has a rotor body engaging segment with a length that is greater than a circumference distance of the fourth rotor being rotated 90 degrees after the fourth rotor has been rotated 180 degrees.

18. The rotary shaft transmission structure as claimed in claim 4, wherein the first shaft and the second shaft are assembled in a housing.

19. The rotary shaft transmission structure as claimed in claim 4, wherein the fixation ends of the first shaft and the second shaft are engaged to a fixation seat, so that the first shaft and the second shaft are respectively fixed on a display module and a machine body module of an electronic apparatus.

20. The rotary shaft transmission structure as claimed in claim 4, wherein the first rotor, the second rotor, the third rotor, the fourth rotor and the traction portion are combined to the first shaft and the second shaft by engaging a fixation assembly.

21. The rotary shaft transmission structure as claimed in claim 19, wherein the display module of the electronic apparatus enables the first shaft to have a rotation range of 0 to 180 degrees and relatively enables the second shaft and the machine body module of the electronic apparatus to synchronously have a rotation range of 0 to 180 degrees in a direction opposite to the first shaft.

22. The rotary shaft transmission structure as claimed in claim 1, wherein at least one of the first end and the second end of the traction portion passed through the bolt bore of the rotor is fixed on the rotor.

23. The rotary shaft transmission structure as claimed in claim 1, wherein at least one of the first end and the second end of the traction portion passed through the bolt bore of the rotor is fixed on the rotor.

\* \* \* \* \*